United States Patent [19]

Cosh

[11] Patent Number: 4,636,838

[45] Date of Patent: Jan. 13, 1987

[54] GENERATING A CHROMA KEYING SIGNAL

[75] Inventor: Ian S. Cosh, Cambridge, England

[73] Assignee: U.S. Philips Corporation, New York, N.Y.

[21] Appl. No.: 725,445

[22] Filed: Apr. 22, 1985

[30] Foreign Application Priority Data

Apr. 26, 1984 [GB] United Kingdom ............... 8410708

[51] Int. Cl.$^4$ .............................................. H04N 9/75
[52] U.S. Cl. ....................................... 358/22; 358/183
[58] Field of Search .................. 358/22, 183, 28, 30

[56] References Cited

U.S. PATENT DOCUMENTS 4,386,363  5/1983  Morrison ............................... 358/22
4,408,221 10/1983  McCoy .................................. 358/22

Primary Examiner—Michael A. Masinick
Attorney, Agent, or Firm—Thomas A. Briody; William J. Streeter; Marianne R. Rich

[57] ABSTRACT

A chroma keying signal generator has an input (1) to which digitally encoded color difference signals (R−Y and B−Y) are applied and output (27) at which a keying signal is produced. The arrangement calculates a value $\tan^{-1}(R-Y)/(B-Y)$ which represents the hue and a value $(R-Y)^2+(B-Y)^2$ which represents the (saturation)$^2$. Preselected values of hue and (saturation)$^2$ are stored in latches (20,22) and compared with the calculated values derived from the incoming color difference signals in comparators (24,25). When the calculated hue is substantially equal to the value stored in latch (20) and the calculated (saturation)$^2$ is greater than the value stored in latch (21) both comparators (24,25) produce an output which causes the AND gate (26) to produce a keying signal which is applied to output 27.

13 Claims, 3 Drawing Figures

GENERATING A CHROMA KEYING SIGNAL

The invention relates to a method of and an arrangement for generating a chroma keying signal.

BACKGROUND OF THE INVENTION

In chroma keying, two scenes are electrically combined into a single composite picture in the following manner. A first scene consists of the elements of a foreground picture, typically including actors, in front of a background of a specified colour, usually blue. The second scene consists of a background picture, typically of a distant location. By use of chroma keying the foreground picture is made to appear in front of the background picture, thus the actors can be made to appear to be at the distant location. To do this a camera views the first scene and provides a first video signal. A second video signal is generated representative of the second scene by any suitable means such as a camera, telecine machine, or video tape recorder, synchronised with the camera viewing the first scene. From the first scene there is also produced a waveform, known as the keying signal, which indicates whether the first video signal instantaneously corresponds to a back-drop area of the first scene or a foreground area of the scene. This keying signal can then be used to operate a fast selector switch so as to select the first video signal when this represents foreground information, but at other times to select the second, background video signal, to provide the composite signal.

Chroma keying has typically operated with RGB signals, that is with non-encoded colour signals. However there is a trend in television studio equipment to operate on encoded luminance (Y), and colour difference $(R-Y$ and $B-Y)$ signals and to carry out all signal processing on these encoded components.

SUMMARY OF THE INVENTION

It is an object of the invention to enable the provision of a method of and apparatus for generating chroma keying signals from $R-Y$ and $B-Y$ component signals.

The invention provides a method of generating a chroma keying signal comprising the steps of:

(a) continuously determining the value of $\tan^{-1} (R-Y)/(B-Y)$;

(b) continuously determining the value of $(R-Y)^2 + (B-Y)^2$;

(c) comparing the determined value of $\tan^{-1} (R-Y)/(B-Y)$ with a pre-selected value thereof;

(d) comparing the determined value of $(R-Y)^2 + (B-Y)^2$ with a pre-selected value thereof; and (e) generating a keying signal when the determined value of $\tan^{-1} (R-Y)/(B-Y)$ is substantially equal to the pre-selected value thereof and the determined value of $(R-Y)^2 + (B-Y)^2$ is equal to or greater than the preselected value.

Step (a) of the method set forth in the preceding paragraph may comprise the steps of:

(I) determining the value of $\log (R-Y)$;

(II) determining the value of $-\log (B-Y)$;

(III) adding $\log (R-Y)$ to $-\log (B-Y)$;

(IV) determining the antilog of $\log (R-Y) -\log (B-Y)$ to produce $(R-Y)/(B-Y)$;

(V) determining the quadrant in which $\tan^{-1} (R-Y)/(B-Y)$ lies; and (VI) determining the value of $\tan^{-1} (R-Y)/(B-Y)$ using the value $(R-Y)/(B-Y)$ produced in step (IV) together with the quadrant determined in step (V).

The pre-selected values of $\tan^{-1} (R-Y)/(B-Y)$ and $(R-Y)^2 + (B-Y)^2$ may be produced by performing steps (a) and (b) while viewing a displayed picture, causing a cursor to point to a desired keying colour on the displayed picture and storing the determined values of $\tan^{-1} (R-Y)/(B-Y)$ and $(R-Y)^2 + (B-Y)^2$ corresponding to the picture position to which the cursor is pointing.

The invention further provides an arrangement for generating a chroma keying signal comprising first means for continuously determining the value of $\tan^{-1} (R-Y)/(B-Y)$, second means for continuously determining the value of $(R-Y)^2 + (B-Y)^2$, third means for comparing the determined value of $\tan^{-1} (R-Y)/(B-Y)$ with a pre-selected value thereof, fourth means for comparing the determined value of $(R-Y)^2 + (B-Y)^2$ with a pre-selected value thereof, and fifth means for generating an output signal when the determined value of $\tan^{-1} (R-Y)/(B-Y)$ is substantially equal to the pre-selected value thereof and the determined value of $(R-Y)^2 + (B-Y)^2$ is equal to or greater than the pre-selected value thereof, the output signal forming the chroma keying signal.

The first means for determining the value of $\tan^{-1} (R-Y)/(B-Y)$ may comprise sixth means for determining the value of $\log (R-Y)$, seventh means for determining the value of $-\log (B-Y)$, eigth means for adding $\log (R-Y)$ to $-\log (B-Y)$, ninth means for obtaining the anti-log of $\log (R-Y) + -\log (B-Y)$, tenth means for determining from the values of $(R-Y)$ and $(B-Y)$ the quadrant in which $\tan^{-1} (R-Y)/(B-Y)$ lines, and eleventh means for forming $\tan^{-1} (R-Y)/(B-Y)$ from the quadrant information and the value of $(R-Y)/(B-Y)$.

The second means may comprise twelfth means for determining the value of $(R-Y)^2$, thirteenth means for determining the value of $(B-Y)^2$, and an adding circuit for adding $(R-Y)^2$ to $(B-Y)^2$.

The sixth, seventh, ninth, tenth, twelfth and thirteenth means may each comprise a read only memory.

A single read only memory may form more than one of the sixth, seventh, ninth, tenth, twelfth and thirteenth means.

The arrangement may further comprise means for selecting a keying colour from a displayed picture said selecting means comprising a cursor control which on operation causes values of $\tan^{-1} (R-Y)/(B-Y)$ and $(R-Y)^2 + (B-Y)^2$ produced by the arrangement and corresponding to the values of $(R-Y)$ and $(B-Y)$ at the point on the displayed picture to which the cursor is pointed to be clocked into first and second stores as the preselected values.

The fifth means may comprise first and second comparators whose outputs are fed to first and second inputs of an AND gate, the output of the AND gate forming the chroma keying signal.

Means may be provided for adding offset values to the determined values of $\tan^{-1} (R-Y)/(B-Y)$ and/or $(R-Y)^2 + (B-Y)^2$ before effecting the comparison with the preselected values.

An arrangement in which the $(R-Y)$ and $(B-Y)$ signals are applied as digitally encoded samples, each at a sampling rate of half of that of the luminance signal, and are multiplexed to form an input data rate equal to the luminance signal sampling rate may comprise a demultiplexer and interpolator, the interpolator averaging succesive (R−Y) and (B−Y) samples to produce intermediate (R−Y) and (B−Y) samples so that (R−Y) and (B−Y) samples within the arrangement both occur at the luminance sampling rate.

The interpolator may comprise a binary adder to which the multiplexed (R−Y) and (B−Y) samples are applied together with the (R−Y) and (B−Y) samples delayed by two luminance sample periods.

BRIEF DESCRIPTION OF THE DRAWINGS

An embodiment of the invention will now be described, by way of example, with reference to the accompanying drawings, in which.

DESCRIPTION OF THE PREFERRED EMBODIMENT

Figure 1:
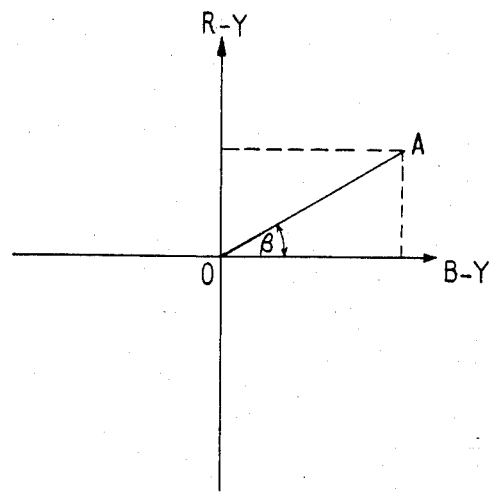
FIG. 1 is a colour circle vector diagram illustrating the colour difference vectors.

FIG. 1 shows a colour circle vector diagram from which it can be derived that for a given colour A its hue is defined by the angle $\beta$ of the vector OA and its saturation by the length of the vector OA. Thus the hue may be defined as $\tan^{-1}(R-Y)/(B-Y)$ and the saturation by $\sqrt{(R-Y)^2+(B-Y)^2}$. Thus by using these identities the hue and saturation of any colour can be derived from the colour difference signals R−Y and B−Y.

In television studio equipment the video signal is commonly encoded in digital form with the luminance signal Y sampled at 13.5 MHz and the colour difference signal R−Y and B−Y sampled at 6.75 MHz but multiplexed together to form a 13.5 MHz interlaced data stream. Each luminance and colour difference sample normally encoded into an 8 bit PCM code. The arrangement shown in FIG. 2 is suitable for operating on video signals in this form.

Figure 2:
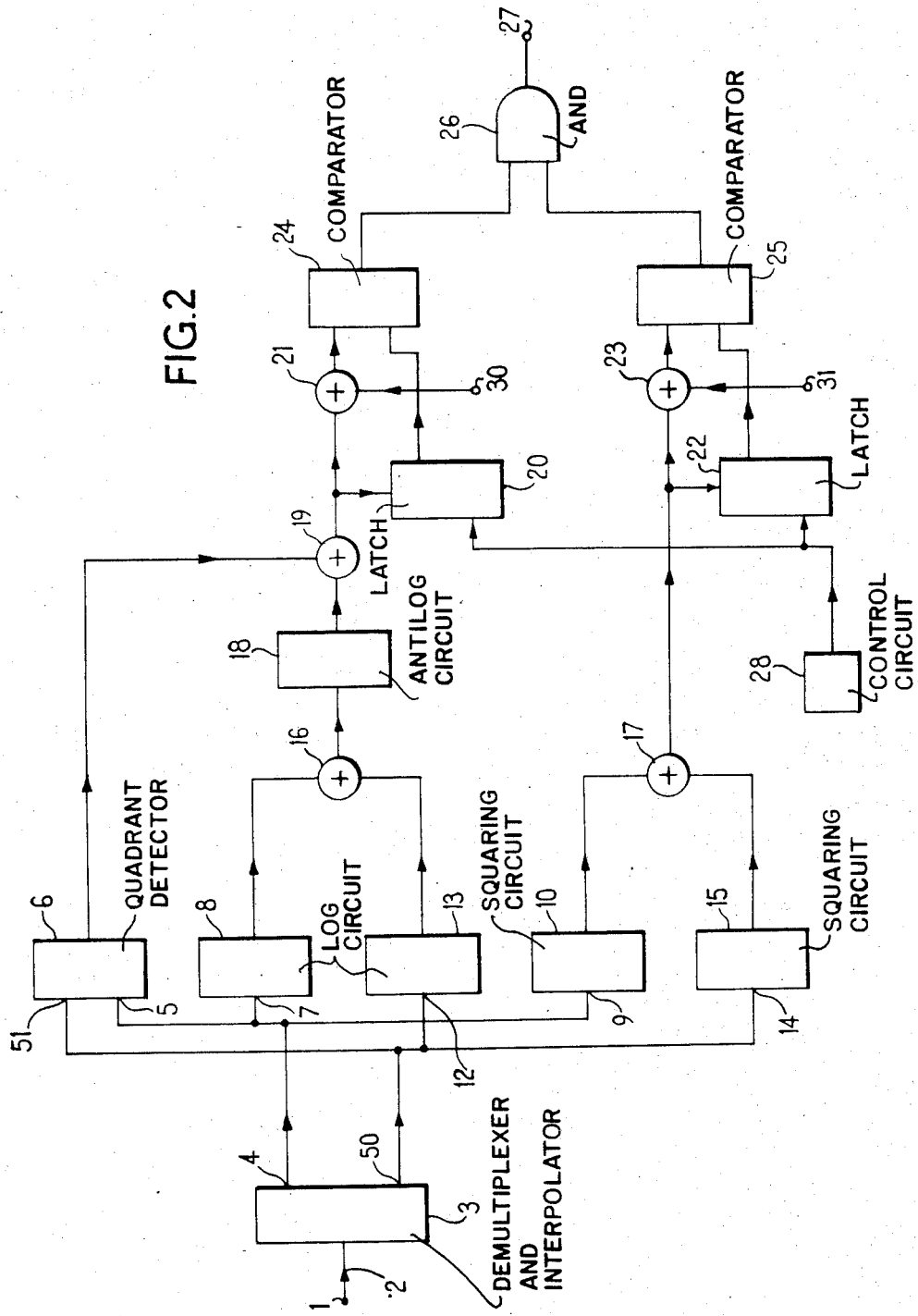
FIG. 2 shows in block schematic form an arrangement for generating a chroma keying signal according to the invention.

The arrangement shown in FIG. 2 has an input 1 which is connected by a path 2 to a demultiplexer and interpolator 3. The interlaced R−Y and B−Y signal is applied to input 1 and demultiplexed to provide a B−Y signal at output 4 and an R−Y signal at output 50. The output 4 is connected to a first input 5 of a quadrant detector 6, to the input 7 of a (−) logarithm forming circuit 8, and to the input 9 of a squaring circuit 10. The output 50 of the demultiplexer and interpolator 3 is connected to a second input 51 of the quadrant detector 6, to the input 12 of a logarithm forming circuit 13, and to the input 14 of a squaring circuit 15. The outputs of the logarithm forming circuits 8 and 13 are fed to first and second inputs of an adding circuit 16 while the outputs of the squaring circuits 10 and 15 are connected to first and second inputs of an adding circuit 17. The output of the adding circuit 16 is fed to the input of an anti-log circuit 18 whose output is fed to a first input of an adding circuit 19. A second input of the adding circuit 19 is connected to the output of the quadrant detector 6. The output of the adding circuit 19 is fed to a hue sample latch 20 and to a first input of an adding circuit 21 while the output of the adding circuit 17 is fed to a saturation sample latch 22 and to a first input of an adding circuit 23. A hue offset control input 30 is connected to a second input of the adding circuit 21 while a saturation offset control input 31 is connected to a second input of the adding circuit 23. The output of the adding circuit 21 is fed to a first input of a comparator 24 while the output of the hue sample latch 20 is fed to a second input of the comparator 24. The output of the adding circuit 23 is fed to a first input of a comparator 25 while the output of the saturation sample latch is fed to a second input of the comparator 25. The outputs of the comparators 24 and 25 are fed to first and second inputs of an AND gate 26 whose output is fed to the output 27 of the arrangement. A sample select control circuit 28 has an output connected to enable inputs of the hue sample latch 20 and the saturation sample latch 22.

In operation the demultiplexer and interpolator 3 separates the incoming multiplexed R−Y and B−Y signals into separate R−Y and B−Y signals which are available at outputs 50 and 4 respectively. An interpolation section is desirable so that the effective data rate of both the R−Y and B−Y signals can be increased to equal the 13.5 Mhz luminance data rate to enable the output keying signal to switch at the sample rate. The interpolation section forms the intermediate samples by adding the adjacent selected samples and dividing by two thus producing intermediate samples which are the average of two successive samples.

The B−Y signals at output 4 are then applied to the logarithm forming circuit 8 which converts the B−Y signal to $(-\log (B-Y))$, to the squaring circuit 10 which converts the B−Y signal to $(B-Y)^2$, and to input 5 of the quadrant detector 6. The R−Y signals at output 50 of the demultiplexer 3 are applied to the logarithm forming circuit 13 which converts the R−Y signal to $\log(R-Y)$, to the squaring circuit 15 which converts the R−Y signal to $(R-Y)^2$ and to the input 51 of the quadrant detector 6. The outputs of the logarithm forming circuits 8 and 13 are added in the adding circuit 16 to form the signal $\log(R-Y) - \log(B-Y)$. The antilog is then taken in the anti-log circuit 18 to form $(R-Y)/(B-Y)$ and added to the quadrant information generated by the quadrant detector 6 from the R−Y and B−Y input signals to form $\tan^{-1}(R-Y)/(B-Y)$ at the output of the adding circuit 19. The quadrant information is required as R−Y and B−Y may be positive or negative and hence the quadrant in which the point A is located must be determined in order to specify the angle $\beta$. Thus the signal at the output of the adding circuit 19 is representation of the hue of the picture at each sampling instant. The outputs of the squaring circuits 10 and 15 are added by the adding circuit 17 to form the signal $(R-Y)^2+(B-Y)^2$ at its output. Thus the signal at the output of the adding circuit 17 is a representation of the saturation.

The signal $\tan^{-1}(R-Y)/(B-Y)$ is fed via the adding circuit 21, where a hue offset value may be added, to the comparator 24 where it is compared with a value stored in the hue sample latch 20 and if these values are substantially equal the comparator 24 feeds an enabling signal to the AND gate 26. The degree of equality required will depend on how many bits of the signal are fed to the comparator, for example the six or seven most significant bits. Similarly the signal $(R-Y)^2+(B-Y)^2$ is fed via the adding circuit 23, where a saturation offset value may be added, to the comparator 25 where it is compared with a value stored in the saturation sample latch 22 and if it is greater than or equal to the value stored in the latch the comparator 25 produces an enabling signal which is fed to the second input of the AND gate 26. Thus if the instantaneous computed hue is the same as that stored in the latch 20 and the instantaneous computed saturation is greater than or equal to that stored in the latch 22 then a keying signal is produced at the output 27. This output signal is used to switch between picture sources in any convenient manner.

Since values of saturation and hue are determined continuously sample by sample it is convenient to select the keying colour by viewing the picture and selecting a sample which corresponds to the desired keying colour. This may be achieved by the sample select control 28, which may be a conventional cursor control circuit, which produces an output pulse which is fed to the hue and saturation sample latches and causes them to latch the hue and saturation$^2$ values at the outputs of the adding circuits 19 and 17 respectively. Alternatively hue and saturation values could be generated elsewhere by any convenient means, e.g. a computer, and entered into the latches 20 and 22.

The logarithm forming circuits 8 and 13, the squaring circuits 10 and 15, the antilog circuit 18, and the quadrant detector 6 may all be formed by suitably programmed read only memories.

Figure 3:
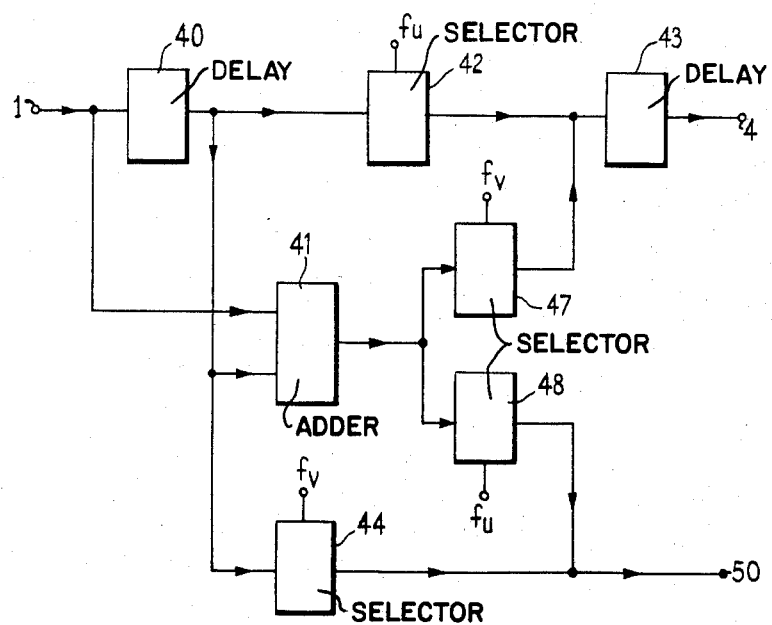
FIG. 3 shows in greater detail a demultiplexing and interpolating arrangement suitable for use in the arrangement of FIG. 2.

The demultiplexer and interpolator 3 is shown in greater detail in FIG. 3. The input multiplexed $R-Y$ and $B-Y$ signals are fed to a two element delay circuit 40 which may comprise two 8 bit latches clocked at the 13.5 MHz sampling rate and to a first set of inputs of an eight bit binary adder 41. The output of the delay circuit 40 is fed to a second set of inputs of the adder 41 and to a $B-Y$ selector circuit 42 which transfers the $B-Y$ signal from the output of the delay circuit 40 to the input of one element delay circuit 43 under the control of a clock signal fu which is at the 6.75 MHz colour difference signal sample rate and whose true state corresponds to the $B-Y$ samples in the multiplexed sample stream. The output of the delay circuit 40 is also connected to an $R-Y$ selector circuit 44 which transfers the $R-Y$ signal from the output of the delay circuit 40 to the output 50 under the control of a clock signal fv which is the inverse of the clock signal fu. The output of the adder circuit 41 is fed to a $B-Y$ interpolated signal selector 47 and to an $R-Y$ interpolated signal selector 48 whose oututs are selected by the fv and fu clock signals respectively. Thus the input of the delay element 43 is fed with $B-Y$ signal samples at a 13.5 MHz sampling rate, alternate $B-Y$ signal samples being interpolated values and after a one element delay these signal samples are passed to the output 4. Similarly the output 50 receives $R-Y$ signal samples at a 13.5 MHz sampling rate, alternate $R-Y$ signal samples being interpolated values. The averaging of $R-Y$ and $B-Y$ samples to produce the alternate interpolated values is achieved by adding successive $R-Y$ (or $B-Y$ as the case may be) signals in the adder 41 discarding the least significant bit and using the carry output as the most significant bit.

While the embodiment described is suitable for use with colour difference signals which have been sampled and digitally encoded it would be possible to use the invention to generate a chroma keying signal from analogue $R-Y$ and $B-Y$ signals. In such a case logarithmic amplifiers could be used instead of read only memories and summing amplifiers instead of the binary adders. Alternatively analogue divider circuits could be used to calculate $\tan^{-1}(R-Y)/(B-Y)$ and multiplier circuits to form $(R-Y)^2$ and $(B-Y)^2$. Similarly the hue and saturation keying values would be stored in an analogue form, for example as a voltage across a capacitor in a sample and hold circuit.

I claim:

1. A method of generating a chroma keying signal comprising the steps of:
   (a) continuously determining the value of $\tan^{-1}(R-Y)/(B-Y)$, where $(R-Y)$ and $(B-Y)$ are colour difference signals;
   (b) continuously determining the value of $(R-Y)^2+(B-Y)^2$;
   (c) comparing the determined value of $\tan^{-1}(R-Y)/(B-Y)$ with a pre-selected value thereof;
   (d) comparing the determined value of $(R-Y)^2+(B-Y)^2$ with a pre-selected value thereof; and
   (e) generating a keying signal when the determined value of $\tan^{-1}(R-Y)/(B-Y)$ is substantially equal to the pre-selected value thereof and the determined value of $(R-Y)^2+(B-Y)^2$ is greater than the preselected value.

2. A method according to claim 1 comprising the steps of:
   (I) determining the value of $\log R-Y$;
   (II) determining the value of $-\log B-Y$;
   (III) adding $\log R-Y$ to $-\log B-Y$;
   (IV) determining the antilog of $\log R-Y - \log B-Y$ to produce $(R-Y)/(B-Y)$;
   (V) determining the quadrant in which $\tan^{-1}(R-Y)/(B-Y)$ lies; and
   (VI) determining the value of $\tan^{-1}(R-Y)/(B-Y)$ using the value $(R-Y)/(B-Y)$ produced in step (IV) together with the quadrant determined in step (V).

3. A method according to claim 1, in which the pre-selected values of $\tan^{-1}(R-Y)/(B-Y)$ and $(R-Y)^2+(B-Y)^2$ are produced by performing steps (a) and (b) while viewing a displayed picture; comprising the steps of causing a cursor to point to a desired keying colour on the displayed picture and storing the determined values of $\tan^{-1}(R-Y)/(B-Y)$ and $(R-Y)^2+(B-Y)^2$ corresponding to the picture position to which the cursor is pointing.

4. An arrangement for generating a chroma keying signal comprising first means for continuously determining the value of $\tan^{-1}(R-Y)/(B-Y)$, where $(R-Y)$ are colour difference signals, second means for continously determining the value of $(R-Y)^2+(B-Y^2$, third means for comparing the determined value of $\tan^{-1}(R-Y)/(B-Y)$ with a pre-selected value thereof, fourth means for comparing the determined value of $(R-Y)^2+(B-Y)^2$ with a pre-selected value thereof, and fifth means for generating an output signal when the determined value of $\tan^{-1}(R-Y)/(B-Y)$ is substantially equal to the pre-selected value thereof and the determined value of $(R-Y)^2+(B-Y)^2$ is greater than the preselected value thereof, the output signal forming the chroma keying signal.

5. An arrangement as claimed in claim 4 in which the first means for determining the value of $\tan-1(R-Y)/(B-Y)$ may comprise sixth means for determining the value of $\log(R-Y)$, seventh means for determining the value of $(-\log(B-Y))$, eighth means for adding $\log(R-Y)$ to $(-\log(B-Y))$, ninth means for obtaining the anti-log of $\log(R-Y)+(-\log(B-Y))$, tenth means for determining from the values of $(R-Y)$ and $(B-Y)$ the quadrant in which $\tan^{-1}(R-Y)/(B-Y)$ lines, and eleventh means for forming $\tan^{-1}(R-Y)/(B-Y)$ from the quadrant information and the value of $(R-Y)/(B-Y)$.

6. An arrangement as claimed in claim 4, in which the second means may comprise twelfth means for determining the value of $(R-Y)^2$ thirteenth means for determining the value of $(B-Y)^2$, and an adding circuit for adding $(R-Y)^2$ to $(B-Y)^2$.

7. An arrangement as claimed in claim 5, in which the sixth, seventh, ninth, tenth, twelfth and thirteenth means may each comprise a read only memory.

8. An arrangement as claimed in claim 7, in which a single read only memory forms more than one of the sixth, seventh, ninth, tenth, twelfth and thirteenth means.

9. An arrangement as claimed in claim 4, comprising means for selecting a keying colour from a displayed picture said selecting means comprising a cursor control which on operation causes values of $\tan^{-1} (R-Y)/(B-Y)$ and $(R-Y)^2+(B-Y)^2$ produced by the arrangement and corresponding to the values of $(R-Y)$ and $(B-Y)$ at the point on the displayed picture to which the cursor is pointed to be clocked into first and second stores as the preselected values.

10. An arrangement as claimed in claim 4 in which the fifth means comprises first and second comparators whose outputs are fed to first and second inputs of an AND gate, the output of the AND gate forming the chroma keying signal.

11. An arrangement as claimed in claim 4 comprising means for adding offset values to the determined values of $\tan^{-1} (R-Y)/(B-Y)$ and/or $(R-Y)^2+(B-Y)^2$ before effecting the comparison with the preselected values.

12. An arrangement as claimed in claim 4, in which the $(R-Y)$ and $(B-Y)$ signals are applied to the arrangement as digitally encoded samples, each at a sampling rate of half of that of the luminance signal, and are multiplexed to form an input data rate equal to the luminance signal sampling rate comprising a demultiplexer and interpolator, the interpolator averaging succesive $(R-Y)$ and $(B-Y)$ samples to produce intermediate $(R-Y)$ and $(B-Y)$ samples so that $(R-Y)$ and $(B-Y)$ samples within the arrangement occur at the luminance sampling rate.

13. An arrangement as claimed in claim 12, in which the interpolator comprises a binary adder to which the multiplexed $(R-Y)$ and $(B-Y)$ samples are applied together with the $(R-Y)$ and $(B-Y)$ samples delayed by two luminance sample periods.

* * * * *